United States Patent
Tang et al.

(10) Patent No.: US 10,694,034 B1
(45) Date of Patent: Jun. 23, 2020

(54) AVOIDING IDENTITY FRAUD AND UNWARRANTED CALLS BY AUTHORIZATION MECHANISM IN COMMUNICATION SYSTEM

(71) Applicant: International Business Machines Corporation, Armonk, NY (US)

(72) Inventors: Xiao Yan Tang, Beijing (CN); Tao Liu, Beijing (CN); Jing Lu, Beijing (CN); Ming Ran Liu, Beijing (CN); Xiao Ling Chen, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/217,238

(22) Filed: Dec. 12, 2018

(51) Int. Cl.
*H04M 3/436* (2006.01)
*H04M 1/57* (2006.01)

(52) U.S. Cl.
CPC .. *H04M 3/4365* (2013.01); *H04M 2203/6027* (2013.01); *H04M 2203/6045* (2013.01)

(58) Field of Classification Search
None
See application file for complete search history.

(56) References Cited

U.S. PATENT DOCUMENTS 8,817,961 B1 * 8/2014 Sterman ............ H04M 3/42042
379/142.05

2002/0056050 A1 * 5/2002 Heiden ............... G06F 21/33
726/10
2007/0118750 A1 * 5/2007 Owen ................. H04L 63/126
713/176

(Continued)

FOREIGN PATENT DOCUMENTS

CN      101384042 A     3/2009
CN      103401876 A    11/2013

(Continued)

OTHER PUBLICATIONS

Mell et al.; "The NIST Definition of Cloud Computing—Recommendations of the National Institute of Standards and Technology"; U.S. Department of Commerce; Sep. 2011; 7 pages.

*Primary Examiner* — Quoc D Tran
(74) *Attorney, Agent, or Firm* — Cantor Colburn LLP; Teddi Maranzano

(57) ABSTRACT

Provided are systems, methods, and media for verifying a commission-based relationship in a communication system. An example method includes generating authorization information by an authorizer that is to be transmitted to a caller and forwarded by the caller to a callee upon a call being initiated between the caller and the callee, in which the authorization information includes at least authorizer identity information, callee identity information, and a caller public key. The method includes signing the authorization information with a private key of the authorizer and transmitting the signed authorization information to the caller. The caller is configured to generate a digital signature via a private key of the caller and transmit the digital signature and the signed authorization information to the callee. The callee is configured to verify the identity of authorizer, caller and callee and event information based on the authorization information.

22 Claims, 7 Drawing Sheets

(56) References Cited

U.S. PATENT DOCUMENTS

| | | | | |
|---|---|---|---|---|
| 2008/0181379 A1* | 7/2008 | Chow | ................ | H04L 63/0823 |
| | | | | 379/142.05 |
| 2008/0187119 A1* | 8/2008 | Vinokurov | .............. | H04L 63/08 |
| | | | | 379/142.05 |
| 2010/0054433 A1 | 3/2010 | Gustave et al. | | |
| 2014/0187203 A1* | 7/2014 | Bombacino | ........... | H04W 12/06 |
| | | | | 455/411 |
| 2015/0236857 A1* | 8/2015 | Feltham | .............. | H04L 63/0414 |
| | | | | 380/270 |
| 2016/0080330 A1 | 3/2016 | Rubin | | |
| 2017/0041459 A1 | 2/2017 | Yaung et al. | | |
| 2017/0264443 A1* | 9/2017 | Tu | ......................... | H04L 9/3247 |

FOREIGN PATENT DOCUMENTS

| | | |
|---|---|---|
| CN | 104539433 A | 4/2015 |
| CN | 105187606 A | 12/2015 |

\* cited by examiner

AVOIDING IDENTITY FRAUD AND UNWARRANTED CALLS BY AUTHORIZATION MECHANISM IN COMMUNICATION SYSTEM

BACKGROUND

The present invention generally relates to communication systems, and more specifically, to methods for avoiding identify fraud and unwarranted calls by authorization mechanisms in communication systems.

The conducting of voice communications via telecommunication systems is prevalent in modern society. Typically, voice communications are conducted in association with telephone numbers. Technology for preventing unwarranted calls and caller fraud however is limited. Presently it is relatively easy for an entity to pretend to be a different entity within the telecom system by tampering with a caller number (e.g., spoofing). As spoofing of phone numbers is a common form of telecommunication intrusion, known systems are unable to prevent fraud as it relates to the identity of organizations and/or public institutions.

For example, in some known telecommunication systems, the systems are unable to assist callers in verifying a commission-based relationship between an authorizer and a caller (e.g., relationship between a restaurant and a delivery person that delivers food from the restaurant). By not being able to verify a commission-based relationship, a security intrusion may occur as a callee may be unable to detect that a caller is pretending to be another entity (e.g., caller alleges to represent an organization which the caller does not actually represent).

Another technical issue of certain telecommunication systems is that such systems are presently unable to efficiently and accurately control incoming calls as present security mechanisms are often based on telephone numbers only (e.g., blacklists, whitelists, etc.). Consider a scenario in which an unwarranted call or an annoying message is sent from a caller to a callee, to block the call from being received under present systems often requires that the phone number associated with the caller be found in a blacklist to block the call from being received and/or accepted by the callee. However, such systems are unable to acquire all of the phone numbers of unwarranted callers as the numbers and/or identity of the unwarranted callers may change over time. Similarly, as an organization may be associated with a large set of telephone numbers and as the large set of telephone numbers may change dynamically, such systems are further unable to efficiently control incoming calls via whitelists and blacklists alone.

SUMMARY

Embodiments of the present invention provide to a computer-implemented method for verifying a commission-based relationship in a communication system through authorization and verification based on event data. A non-limiting example of the computer-implemented method includes generating, by an authorizer of the communication system comprising one or more processors, authorization information that is to be transmitted to a caller and forwarded by the caller to a callee upon a call being initiated between the caller and the callee, in which the authorization information includes at least authorizer identity information, callee identity information, and a caller public key. The method includes signing, by the authorizer, the authorization information with a private key of the authorizer. The method includes transmitting, by the authorizer, the signed authorization information to the caller. The caller is configured to generate a digital signature via a private key of the caller and transmit the digital signature and the signed authorization information to the callee. The callee is configured to verify the authorization information by at least verifying the signature of the signed authorization information via a public key of the authorizer, extracting the public key of the caller from the authorization information, and verifying an identity of the caller based on the extracted public key of the caller.

In some embodiments of the present invention, the callee is further configured to maintain a whitelist, comprising a plurality of public keys of a plurality of entities, check the whitelist to determine if the authorizer is allowed to contact the callee, and perform the verifying of the authorization information in response to determining that the authorizer is allowed to contact the callee, in which the callee is configured to accept the call from the caller in response to the authorization information being verified. In some embodiments of the present invention, the signing of the authorization information includes authorizer identity information, public key of caller, callee identity information, authorization duration and other information.

Embodiments of the present invention provide a system for verifying a commission-based relationship in a communication system through authorization and verification based on event data. A non-limiting example of the system includes an authorizer, a caller, and a callee. The authorizer is configured to generate authorization information that is to be transmitted to a caller and forwarded by the caller to a callee upon a call being initiated between the caller and the callee, in which the authorization information includes at least authorizer identity information, callee identity information, and a caller public key. The authorizer is configured to sign the authorization information with a private key of the authorizer. The authorizer is configured to transmit the signed authorization information to the caller. The caller is configured to generate a digital signature via a private key of the caller and transmit the digital signature and the signed authorization information to the callee. The callee is configured to verify the authorization information by at least verifying the signature of the signed authorization information via a public key of the authorizer, extracting the public key of the caller from the authorization information, and verifying an identity of the caller based on the extracted public key of the caller.

As noted above, in some embodiments of the present invention, the callee is further configured to maintain a whitelist having a plurality of public keys of a plurality of entities, check the whitelist to determine if the authorizer is allowed to contact the callee, and perform the verifying of the authorization information in response to determining that the authorizer is allowed to contact the callee, in which the callee is configured to accept the call from the caller in response to the authorization information being verified. In some embodiments of the present invention, the signing of the authorization information includes authorizer identity information, public key of caller, callee identity information, authorization duration and other information.

Embodiments of the present invention provide a computer program product for verifying a commission-based relationship in a communication system through authorization and verification based on event data, the computer program product including a computer readable storage medium having program instructions embodied therewith. The program instructions are executable by a system comprising one or more processors to cause the system to perform a method.

A non-limiting example of the computer-implemented method includes generating, by an authorizer of the system, authorization information that is to be transmitted to a caller and forwarded by the caller to a callee upon a call being initiated between the caller and the callee, in which the authorization information includes at least authorizer identity information, callee identity information, and a caller public key. The method includes signing, by the authorizer, the authorization information with a private key of the authorizer. The method includes transmitting, by the authorizer, the signed authorization information to the caller. The caller is configured to generate a digital signature via a private key of the caller and transmit the digital signature and the signed authorization information to the callee. The callee is configured to verify the authorization information by at least verifying the signature of the signed authorization information via a public key of the authorizer, extracting the public key of the caller from the authorization information, and verifying an identity of the caller based on the extracted public key of the caller.

In some embodiments of the present invention, the callee is further configured to maintain a whitelist having a plurality of public keys of a plurality of entities, check the whitelist to determine if the authorizer is allowed to contact the callee, and perform the verifying of the authorization information in response to determining that the authorizer is allowed to contact the callee, in which the callee is configured to accept the call from the caller in response to the authorization information being verified. In some embodiments of the present invention, the signing of the authorization information includes authorizer identity information, public key of caller, callee identity information, authorization duration and other information.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
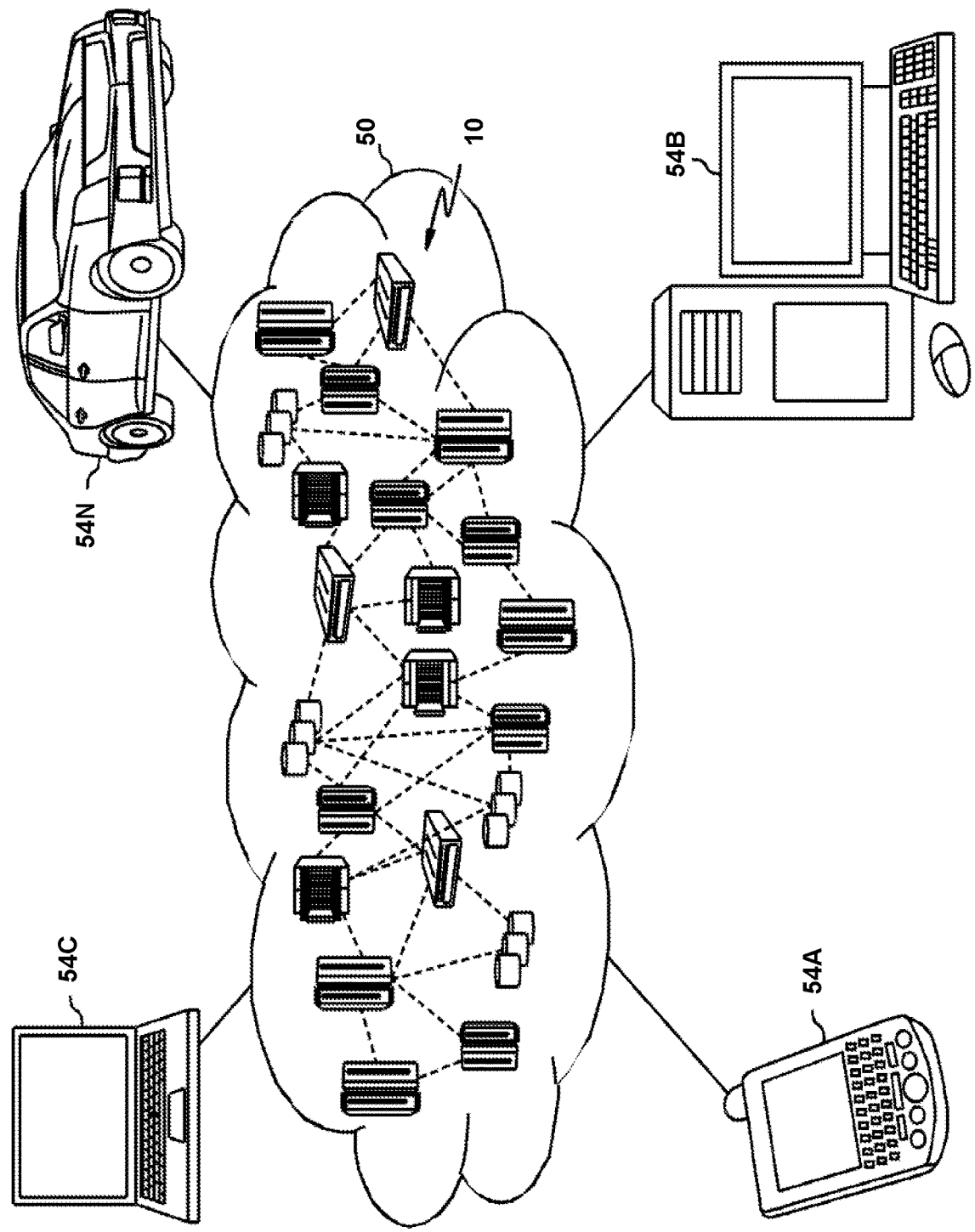
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted, or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two-digit or three-digit reference numbers. With minor exceptions (e.g., FIGS. 1-2), the leftmost digit of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
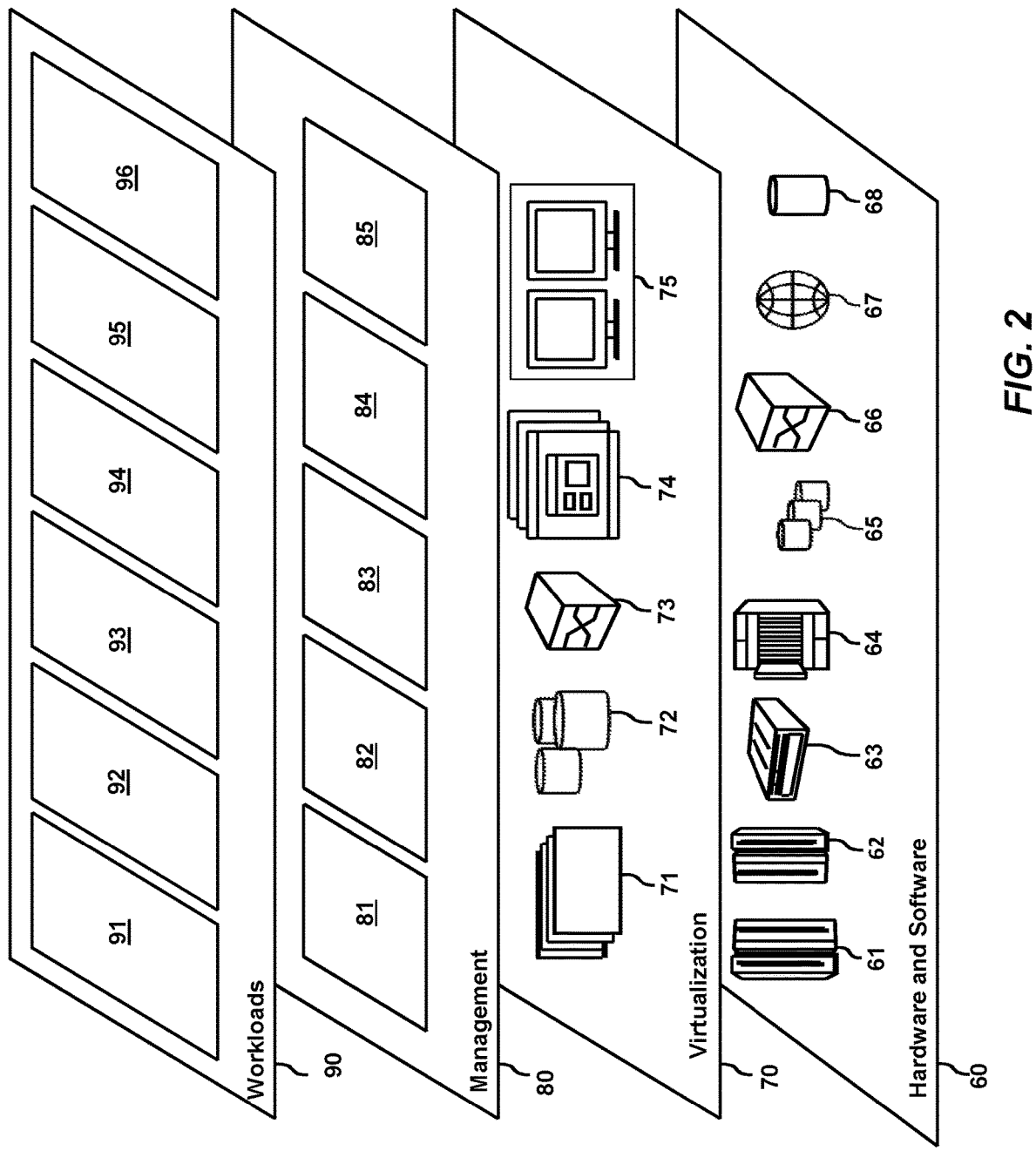
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and voice communication processing 96.

Turning now to an overview of technologies that are more specifically relevant to aspects of the invention, as noted above, communication through telecommunication systems is prevalent in modern society. Typically, voice communications are conducted in association with telephone numbers. Trust mechanisms for preventing unwarranted calls and caller fraud however are limited. Presently it is relatively easy for an entity to pretend to be a different entity within the telecom system by tampering with a caller number (e.g., spoofing). As spoofing of phone numbers is a common form of telecommunication intrusion, known systems are unable to prevent fraud as it relates to the identity of organizations and/or public institutions.

For example, in some known telecommunication systems, the systems are unable to assist callers in verifying a commission-based relationship between an authorizer and a caller (e.g., relationship between a restaurant and a delivery person that delivers food from the restaurant). By not being able to verify a commission-based relationship, a callee may be unable to detect whether a caller is pretending to be another entity (e.g., caller alleges to represent an organization which the caller does not actually represent). Consider a scenario where a service/courier of a company is pretending to be an authorized courier of the company. As the phone number associated with the company can be spoofed, the callee would be unaware that the service/courier is fraudulent. Consider a scenario where a caller alleges to be representing a certain individual such as a principal-agent that is associated with a trusted landlord. In such a scenario, the known system would be unable to verify that the caller is, in fact, the principal agent of the trusted landlord as the phone number of the actual principal agent may be spoofed by a malicious third party.

Another technical issue of certain telecommunication systems is that such systems are presently unable to efficiently and accurately control incoming calls as present security mechanisms are often based on telephone numbers only (e.g., blacklists, whitelists, etc.). Consider a scenario where an unwarranted call or an annoying message is sent from a caller to a callee, present systems require that the phone number associated with the caller be part of a blacklist to block the call from being received. However, such systems are unable to acquire all the phone numbers of unwarranted callers as the numbers are changing over time. Similarly, as an organization may be associated with a large set of telephone numbers and as the large set of telephone numbers may change dynamically, such systems are further unable to efficiently control incoming calls via whitelists and blacklists alone. For example, consider a scenario where a delivery service utilizes a plurality of independent couriers to deliver goods at different points in time, known systems would be unable to correctly verify that a particular caller is, in fact, a courier of the delivery service as the whitelist may not include the phone number of that particular caller (e.g., a new courier who has a telephone number that has not yet been added to a whitelist).

Some known systems have attempted to solve one or more of the technical problems above but have failed to do so. For example, as noted above, some current solutions rely on verifying a commission-based relationship between an organization and a caller by identifying a phone number in a whitelist. However, this approach has several drawbacks. As phone numbers can be easily forged, phone numbers alone cannot be used to accurately identify an entity. Some systems attempt to verify the identity of a caller by verifying a digital signature of caller, however, this method can only verify the identity of a caller/callee and not a commission-based relationship.

Some systems utilize a root certificate in an attempt to protect against identity fraud. For example, some organizations may issue a certificate to subordinates of the organization that are trusted representatives of the organization. However, such root certificate methodologies are unable to accurately identify commission-based relationships for individuals that represent an organization (i.e., authorizer) at a later point in time. As root certification methodologies are not based on event data, an employee of an organization may be able to abuse the extent of authorization (if any) that is established by an organization (e.g., time-limited authorization to contact a customer). As some commission-based relationships are dynamic (e.g., take-out food delivery service), root certificate based approaches are unable to handle situations where commission-based relationships change dynamically (e.g., take-out food delivery service that uses different carriers at different points in time). The use of whitelists and blacklists have similar drawbacks as whitelists are often too rigid and blacklists are ineffective in dynamic environments (e.g., non-static set of telephone numbers).

Accordingly, by tampering with a caller number, it is currently easy for an entity to pretend to be another identity/entity within current telecommunication systems at least because the control mechanism used by current telecommunication systems to control entities within the telecommunications systems is weak. As such, a trust mechanism based on the entity (e.g., individual, organization, a public institution, etc.) instead of based on a telephone number alone may be needed to resolve the above problems.

Turning now to an overview of the aspects of the invention, one or more embodiments of the invention address the above-described shortcomings of the prior art by providing systems, media, and methods that are able to identify fraud and avoid an unwarranted call accurately by verifying commission-based relationships in communication networks through authorization and verification based on event data, in which an authorizer generates and signs an authorization that includes the identity information of all participants (e.g., authorizer(s), caller(s), callee(s), etc.) and event information to be verified combined with the signed event from a caller.

The above-described aspects of the invention address the shortcomings of the prior art by a trust mechanism that is able to verify an entity, based on entity identity and not just a caller's telephone number. In some embodiments of the present invention, the entity identity includes not only a caller's identity but also an identity of an authorizer who authorized the caller to represent it. In some embodiments of the present invention, an authorizer is a single person, a group of people, or an organization (e.g., a company). In some embodiments of the present invention, a do-not-disturb calling feature is provided that is accurate and does not affect call quality.

Figure 3:
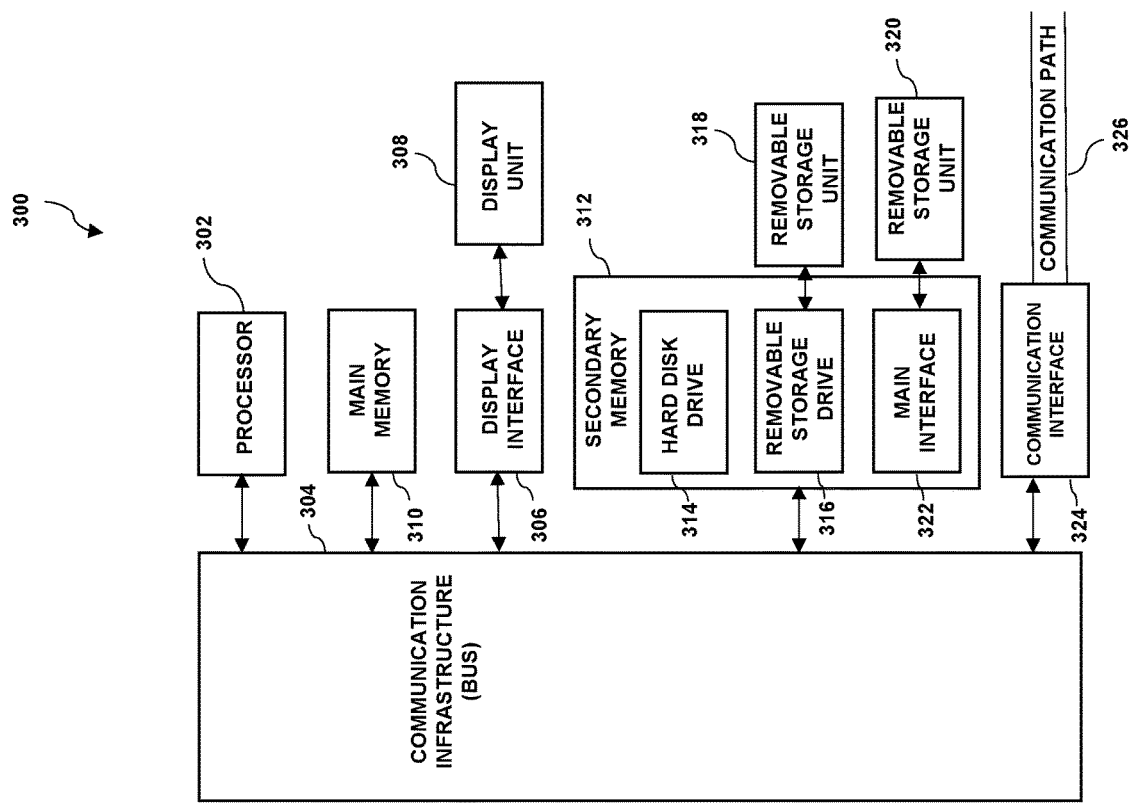
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 that is useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc., which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using a wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
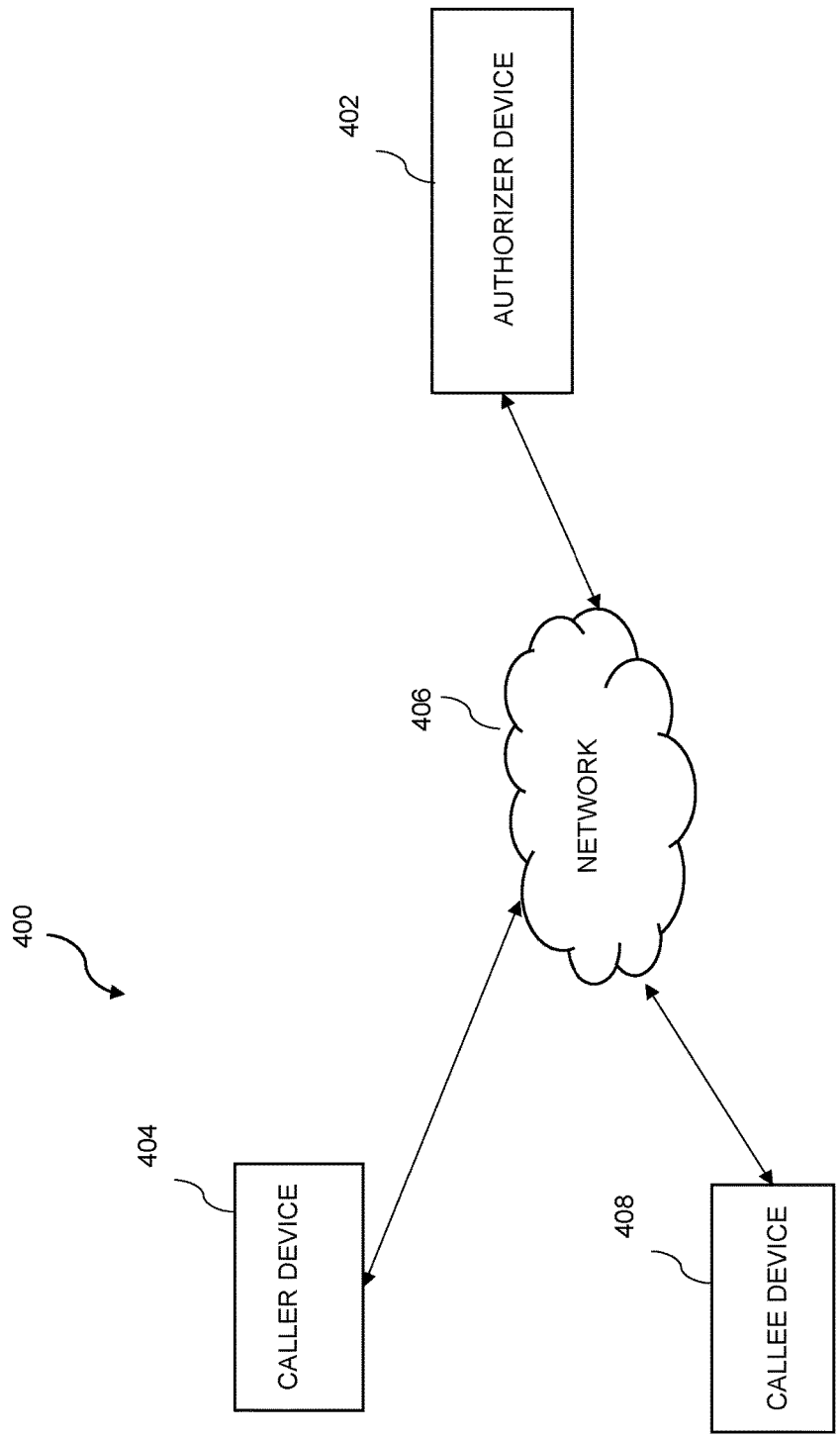
FIG. 4 depicts an exemplary distributed environment in accordance with one or more embodiments of the present invention.

Referring now to FIG. 4, an exemplary distributed environment 400 is presented for avoiding identify fraud and unwarranted calls. Distributed environment 400 includes one or more user authorizer devices 402, one or more caller devices 404, and one or more callee devices 408, which are interconnected via network 406. FIG. 4 provides an illustration of only one example system and does not imply any limitation with regard to other systems in which different embodiments of the present invention may be implemented. Various suitable modifications to the depicted environment may be made, by those skilled in the art, without departing from the scope of the invention as recited by the claims. Authorizer device 402, caller device 404, and callee device 408 employ hardware and/or software to solve problems that are highly technical in nature, that are not abstract and that cannot be performed as a set of mental acts by a human.

In some embodiments of the present invention, authorizer device 402 is a standalone computing device, a management server, a web server, a mobile computing device, or other suitable electronic device and/or computing system capable of receiving, sending, and processing data. In some embodiments of the present invention, video authorizer device 402 is a server computing system utilizing multiple computers, such as in cloud computing environment 50 (FIG. 1). In some embodiments of the present invention, authorizer device 402 is a laptop computer, a tablet computer, a netbook computer, a personal computer (PC), a desktop computer, a personal digital assistant (PDA), a smartphone, or other suitable programmable electronic device capable of communicating with caller device 404, callee device 408 and other computing devices (not shown) within distributed environment 400 via network 406. In some embodiments of the present invention, authorizer device 402 is a computing system utilizing clustered computers and components (e.g., database server computers, application server computers, etc.) that act as a single pool of seamless resources that are accessible within distributed environment 400. In some embodiments of the present invention, authorizer device 402 is configured to make and/or receive calls such as, for example, telephone calls, VoIP calls, and/or other forms of voice communication. Authorizer device 402 may have internal and external hardware components, such as those depicted and described above with respect to FIG. 3.

Network 406 can be, for example, a telecommunications network, a local area network (LAN), a wide area network (WAN), such as the Internet, or a combination of the three, and can include wired, wireless, or fiber optic connections. Network 406 can include one or more wired and/or wireless networks that are capable of receiving and transmitting data, voice, and/or video signals including multimedia signals that include voice, data, and video information. In general, network 406 can be any suitable combination of connections and protocols that can support communications between authorizer device 402, caller device 404, callee device 408, and/or other computing devices (not shown) within a distributed environment 400. For example, in some embodiments of the present invention, network 406 is a telecommunications network such as a cell phone network, a landline network, a packet-switch network, a public switched telephone network, or another suitable form of wireless or wired voice communication supporting network. In some embodiments of the present invention, distributed environment 400 is implemented as part of a cloud computing environment such as cloud computing environment 50 (FIG. 1).

Caller device 404 and callee device 408 are configured to allow users of the devices to send and/or receive information to each other and/or to authorizer device 402, including information which includes, for example, voice communication such as a phone call that is conducted over network 406. In some embodiments of the present invention, caller device 404 and/or callee device 408 are each a laptop computer, a tablet computer, a netbook computer, a personal computer (PC), a desktop computer, a personal digital assistant (PDA), a smartphone, an internet-of-things (IoT) enabled device, and/or other suitable programmable electronic devices capable of communicating with various components and devices within distributed environment 400 (e.g., conducting a telephone call). In some embodiments of the present invention, Caller device 404 and/or callee device 408 comprises two or more separate devices. In some embodiments of the present invention, caller device 404, callee device 408, and authorizer device 402 comprise a single device. In some embodiments of the present invention, caller device 404 and/or callee device 408 are each a programmable electronic mobile device or a combination of programmable electronic mobile devices capable of executing machine-readable program instructions and communicating with other computing devices (not shown) within distributed environment 400. In some embodiments of the present invention, caller device 404 and/or callee device 408 include internal and external hardware components, such as those depicted and described above with respect to FIG. 3.

Figure 5:
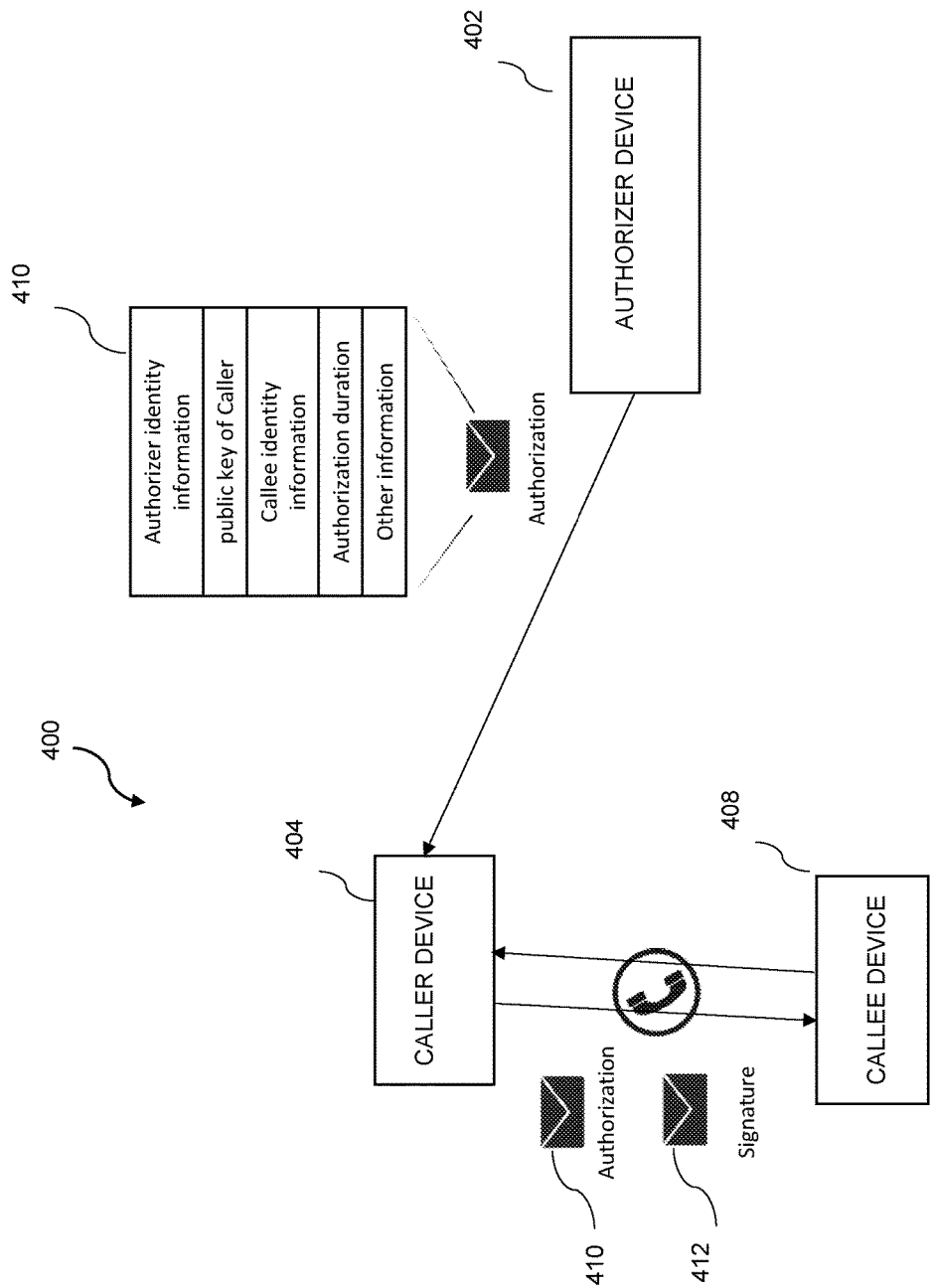
FIG. 5 depicts an example implementation of the distributed environment of FIG. 4 in accordance with one or more embodiments of the present invention.

FIG. 5 depicts an example implementation of distributed environment 400 in accordance with one or more embodiments of the present invention. In some embodiments of the present invention, public and private cryptographic key pairs are generated for each entity in distributed environment 400. Although only three entities are depicted in FIG. 5 (e.g., authorizer device 402, caller device 404, callee device 408), other numbers of entities may be supported in one or more embodiments of the present invention. For example, in some embodiments of the present invention, there may be a plurality of authorizers, a plurality of caller devices, and/or a plurality of callee devices Authorizer device 402 is configured to generate authorization information 410, in which the authorization information is to be transmitted by authorizer device 402 to caller device 404 and later forwarded by caller device 404 to callee device 408 upon initiating a call to the callee (e.g., phone call, VoIP call, conference call, audio message, video message, and/or other suitable types of voice communication). As will be discussed in further detail below, the authorization information 410 is to be used by callee device 408 to verify the identity of caller device 404 and/or authorizer device 402 for various purposes such as to protect against fraud and/or to avoid unwarranted calls. In some embodiments of the present invention, authorizer information 410 includes authorizer identity information, callee identity information, and a caller's public key. The authorizer identity information includes data that can be used to uniquely identify authorizer device 402 or a user of authorizer device 402. For example, in some embodiments of the present invention, the authorizer identity information includes a MAC address, a client ID, a network address, a phone number, an entity name (e.g., an individual's name, a company's name, an organization's name, etc.), an entity physical address (e.g., residential address, commercial address, etc.), and/or other suitable information that allows for distinguishing one entity from another entity. The callee identity information includes data of users that authorizer device 402 is trusted to communicate with directly or indirectly (e.g., an entity that is to receive a phone call). The callee identity information can be used to uniquely identify callee device 408 or a particular user of callee device 408 (e.g., a callee). For example, in some embodiments of the present invention, the callee identity information includes a MAC address, a client ID, a network address, a phone number, an entity name (e.g., an individual's name, a company's name, an organization's name, etc.), an entity physical address (e.g., residential address, commercial address, etc.), and/or other suitable information that allows for distinguishing one entity from another entity.

In some embodiments of the present invention, the authorization information further includes authorization duration information and/or other information such as event or transaction data. In some embodiments of the present invention, the authorization duration information establishes how long the authorization is to last. For example, in some embodiments of the present invention, the duration information may include an authorization deadline like a predetermined amount of time (e.g., predetermined seconds, minutes, hours, days, weeks, months, and/or years), and/or a predetermined deadline (e.g., a predetermined date and/or predetermined time). Calls that are received by the callee outside the scope of the authorization deadline may be blocked and/or rejected by callee device 408. In some embodiments of the present invention, the other information (e.g., event data) includes a conditional or logical event such that upon completion of a particular event or satisfaction of a particular condition, the authorization is ended. For example, if a callee requested that food be delivered to the house of the callee, the event data may establish that the authorization of contacting the callee is to end upon completion of the delivery. In other words, a delivery person (e.g., caller of calling device 404) would not be authorized to communicate with the callee after the food has been delivered to the callee's house.

Authorizer device 402 is configured to sign the generated authorization information 410 with the private key of authorizer device 402 and then transmit the signed authorization information 410 to caller device 404. For example, in the context of FIG. 4, the authorization information 410 generated by authorizer device 402 includes the authorizer identity information, the caller's public key, the callee identity information, the authorization duration, and other information. In other words, upon authorizer device 402 signing authorization information 410, the authorization information 410 would be signed such that other entities are unable to tamper or forge the authorization information. This would allow caller device 404 and callee device 408 to identify the authorization information of authorizer device 402 by verifying the signed authorization information 410 through the public key of authorizer device 402. As will be discussed in further detail below, caller device 404 will be able to generate a digital signature 412 for the authorization information 410 and transmit it to callee device 408. Once the authorization information is signed by authorizer device 402, authorizer device 402 is configured to transmit the signed authorization information (i.e., authorization information 410) to caller device 404. For example, in some embodiments of the present invention the authorizer device 404 uses its private key to encrypt that content that it wants to sign, and then appends the encrypted content to content that remains unencrypted (i.e., non-encrypted content). The whole content, which includes the encrypted content and non-encrypted content, is then transmitted.

Caller device 404 is configured to generate a digital signature 412 via the private key of caller device 404 and transmit the digital signature 412 and the signed authorization information to callee device 408 upon initiating a call to callee device 408 (e.g., a telephone call, a VoIP call, a video conference call, and/or other suitable types of voice communication). For example, if a delivery person places a phone call to a user who requested food service, a device of the delivery person would communicate the digital signature 412 and the signed authorization information 410 to the user upon the delivery person dialing a phone number of the user. In some embodiments of the present invention, the digital signature 412 and the signed authorization information 410 is communicated from caller device 404 to callee device 408 via communication packets having digital communication information (e.g., packets of a packet-switched network). In some embodiments of the present invention, the digital signature 412 and the signed authorization information 410 is communicated via voice using steganography technology.

Callee device 408 is configured to verify the signature of authorization information 410 that is received from caller device 404 using the public key of authorizer device 402 and verify the information that is within the authorization information 410. In some embodiments of the present invention, callee device 408 is further configured to accept the call from caller device 404 if the verification of the authorization information passes and to reject the call if the verification of the authorization information fails. For example, in some embodiments of the present invention, callee device 408 is configured to verify the authorizer's identity via the public key of authorizer device 402. For example, in some embodiments of the present invention, callee device 408 verifies the signature of the authorization information by comparing non-encrypted content to the decrypted content, and then, if the non-encrypted content and the decrypted content are the same, the verification of authorizer's signature passes. Then callee device 408 is configured to extract the public key of the caller from the authorization information 410 (i.e., the caller's public key that is included in authorization information 410), utilizing the extracted public key of caller device 404 to verify an identity of caller device 404 via the signature 412 generated by the private key of the caller. In some embodiments of the present invention, the callee device 408 is configured to verify other information including the event and authorization duration information in authorization information 410. A call from caller device 404 is accepted if all the above verification pass.

In some embodiments of the present invention, the verifying of the authorization information further or alternatively includes callee device 408 being configured to verify the authorizer identity information of authorization information 410 based on the public key of the authorizer. In some embodiments of the present invention, callee device 408 includes a database comprising a list of trusted authorizer devices and a list of public keys of the trusted authorizer devices.

In some embodiments of the present invention, the verifying of the authorization information further or alternatively includes callee device 408 being configured to verify the callee identity information by comparing predetermined identity information of the callee to the callee identity information found in authorization information 410. In some embodiments of the present invention, the predetermined identity information of the callee is information stored in callee device 408 that can be used to uniquely identify callee device 408 from other entities. For example, in some embodiments of the present invention, the predetermined identity information stored in callee device 408 includes and/or comprises a MAC address, a client ID, a network address, a phone number of the callee, the name of the callee (e.g., an individual's name, a company's name, an organization's name, etc.), the callee's physical address (e.g., residential address, commercial address, etc.), and/or other suitable information that allows for distinguishing one entity from another entity.

In some embodiments of the present invention, the verifying of the authorization information further or alternately includes callee device 408 being configured to determine whether a predetermined authorization deadline found in authorization duration information 410 has expired, in which callee device 408 is configured to reject the call from caller device 404 in response to the authorization deadline being expired.

As noted above, in some embodiments of the present invention, authorization information 410 can be used to identify one person or a group of people (e.g., a plurality of callees and/or callers). In some embodiments of the present invention, authorization information 410 includes a public key of each caller, of a plurality of callers, and/or includes caller identity information for each callee, of a plurality of callees.

In some embodiments of the present invention, callee device 408 is further configured to provide support for a do-not-disturb feature. For example, in some embodiments of the present invention, callee device 408 is configured to maintain a whitelist comprising a plurality of public keys, of a plurality of entities (e.g., a plurality of authorizers and/or plurality of callees). Callee device 408 is configured to check the whitelist to determine if authorizer device 402 is allowed to contact callee device 408 (e.g., checking to see if the whitelist includes the public key of authorizer device 402). If callee device 408 determines that authorizer device 402 is allowed to contact callee device 408, the verification of the authorization information is then performed in response to determining that authorizer device 402 is allowed to contact callee device 408. Callee device 408 is configured to accept the call from caller device 404 in response to the verification passing (e.g., verifying the identity of authorizer device 402, verifying the identity of caller device 404, verifying the identity of callee device 408, verifying that the authorization duration has not expired, etc.).

Figure 6:
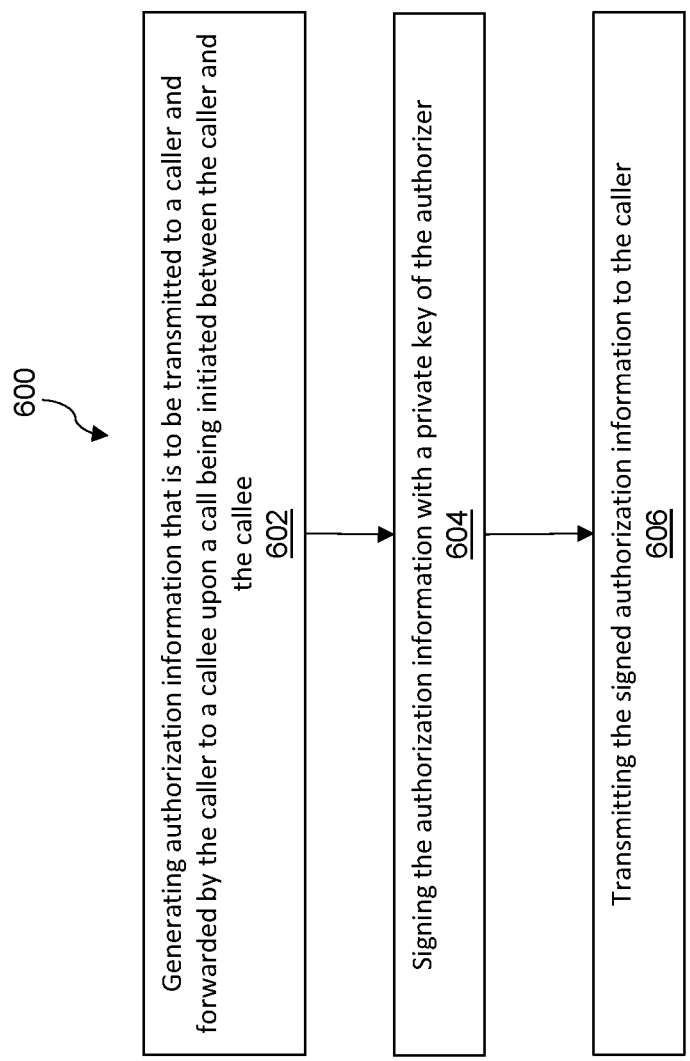
FIG. 6 depicts a flow diagram illustrating a methodology in accordance with one or more embodiments of the present invention.

Additional details of the operation of authorizer 402 will now be described with reference to FIG. 6, wherein FIG. 6 depicts a flow diagram illustrating a methodology 600 according to one or more embodiments of the present invention. At 602, authorization information is generated by an authorizer of a communication that is to be transmitted to a caller and forwarded by the caller to a callee upon a call being initiated between the caller and the callee. The authorization information includes at least authorizer identity information, callee identity information, and a caller public key. At 604, the authorization information is signed by the authorizer with a private key of the authorizer. At 606, the signed authorization information is transmitted to the caller, in which the caller is configured to generate a digital signature via a private key of the caller and transmit the digital signature and the signed authorization information to the callee. The callee is configured to verify the authorization information and authorizer's identity information via a public key of the authorizer, extracting the public key of the caller from authorization information 410, and verifying an identity of the caller based on the extracted public key of the caller.

In some embodiments of the present invention, the callee is further configured to maintain a whitelist comprising a plurality of public keys of a plurality of entities, check the whitelist to determine if the authorizer is allowed to contact the callee, and then perform the verifying of the authorization information in response to determining that the authorizer is allowed to contact the callee, in which the callee is configured to accept the call from the caller in response to the authorization information being verified.

In some embodiments of the present invention, the authorization information further includes authorization duration information, in which the verifying of the authorization information by the callee further includes the callee being configured to determine whether a predetermined authorization deadline found in the authorization duration information has expired, in which the callee is configured to reject the call from the caller in response to the authorization deadline being expired. In some embodiments of the present invention, the verifying of the authorization information further includes the callee being configured to verify the authorizer identity information based on the public key of the authorizer. In some embodiments of the present invention, the verifying of the authorization information further includes the callee being configured to verify the callee identity information by comparing predetermined identity information of the callee to the callee identity information found in the authorization information.

In some embodiments of the present invention, the signing of the authorization information includes authorizer identity information, public key of caller, callee identity information, authorization duration and other information. In some embodiments of the present invention, the callee is configured to accept the call if the verification of the authorization information passes and reject the call if the verification of the authorization information fails.

Figure 7:
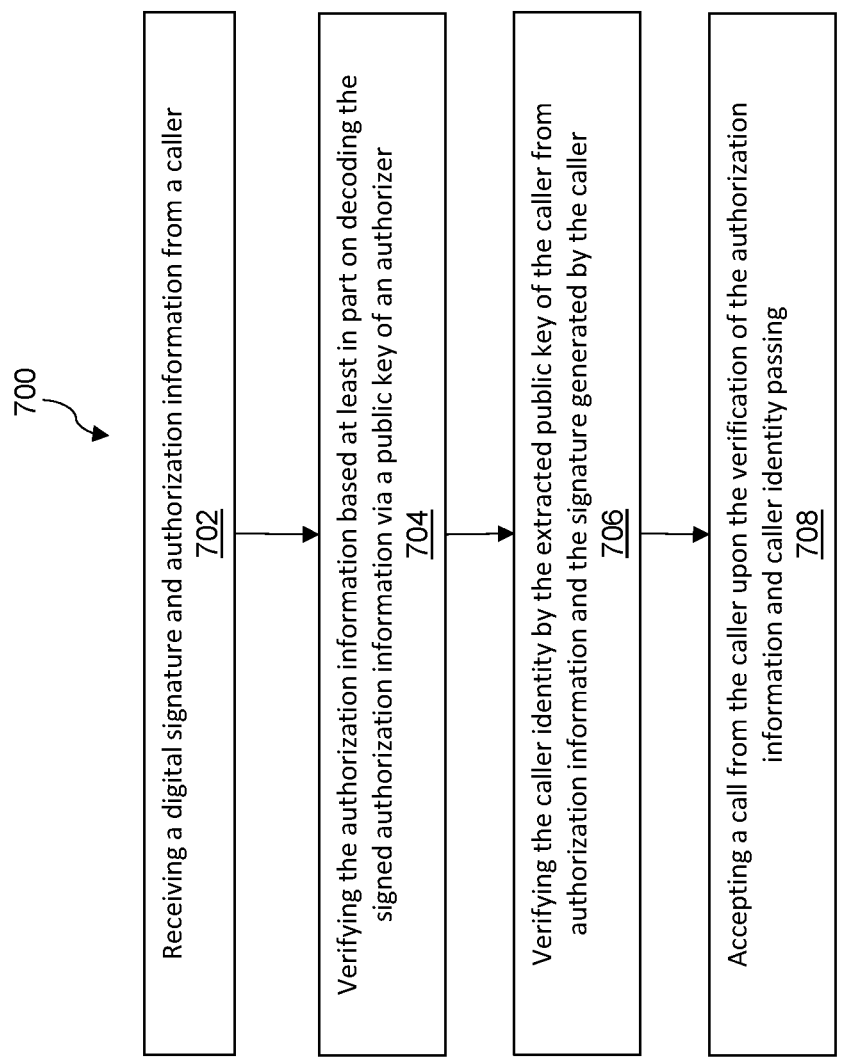
FIG. 7 depicts a flow diagram illustrating another methodology in accordance with one or more embodiments of the present invention.

Additional details of the operation of callee device 408 will now be described with reference to FIG. 7, wherein FIG. 7 depicts a flow diagram illustrating a methodology 700 according to one or more embodiments of the present invention. At 702, a digital signature and authorization information is received by a callee from a caller. The authorization information includes at least authorizer identity information, callee identity information, and a caller public key, in which the authorization information is signed by an authorizer with a private key of the authorizer. The authorizer is configured to generate the authorization information, sign the authorization information, and transmit the authorization information to the caller, in which the caller is configured to generate the digital signature via a private key of the caller and transmit the digital signature and the signed authorization information to the callee.

At 704, the authorization information is verified by the callee by at least verifying the signature of the signed authorization information via a public key of the authorizer, extracting the public key of the caller from the authorization information 410, and verifying an identity of the caller based on the extracted public key of the caller. At 706, the caller identify is verified by the extracted public key of the caller from the authorization information and the signature generated by the caller. At 708, a call is accepted by the callee from the caller upon the verification of the authorization information and caller identity passing.

In some embodiments of the present invention, methodology 700 further includes maintaining, by the callee, a whitelist comprising a plurality of public keys of a plurality of entities, checking, by the callee, the whitelist to determine if the authorizer is allowed to contact the callee, and performing, by the callee, the verifying of the authorization information in response to determining that the authorizer is allowed to contact the callee.

In some embodiments of the present invention, the authorization information further includes authorization duration information, in which the verifying of the authorization information at 704 further includes the callee determining whether a predetermined authorization deadline found in the authorization duration information has expired and rejecting the call from the caller in response to the authorization deadline being expired.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for verifying a commission-based relationship in a communication system by authorization and verification based on event, the method comprising:

generating, by an authorizer of the communication system comprising one or more processors, authorization information that is to be transmitted to a caller and forwarded by the caller to a callee upon a call being initiated between the caller and the callee, wherein the authorization information includes at least authorizer identity information, callee identity information, and a caller public key;

signing, by the authorizer, the authorization information with a private key of the authorizer; and transmitting, by the authorizer, the signed authorization information to the caller;

wherein the caller is configured to generate a digital signature via a private key of the caller and transmit the digital signature and the signed authorization information to the callee; and wherein the callee is configured to verify the authorization information by at least verifying the signature of the signed authorization information via a public key of the authorizer, extracting the public key of the caller from the authorization information, and verifying an identity of the caller based on the extracted public key of the caller, and wherein the verifying of the authorization information further includes the callee being configured to verify the authorizer identity information based on the public key of the authorizer.

2. The computer-implemented method of claim 1, wherein the callee is further configured to:
maintain a whitelist comprising a plurality of public keys of a plurality of entities;
check the whitelist to determine if the authorizer is allowed to contact the callee; and
perform the verifying of the authorization information in response to determining that the authorizer is allowed to contact the callee, wherein the callee is configured to accept the call from the caller in response to the authorization information being verified.

3. The computer-implemented method of claim 1, wherein the authorization information further includes authorization duration information, wherein the verifying of the authorization information further includes the callee being configured to determine whether a predetermined authorization deadline found in the authorization duration information has expired, wherein the callee is configured to reject the call from the caller in response to the authorization deadline being expired.

4. The computer-implemented method of claim 1, wherein the signed authorization information includes the authorizer identity information, the public key of caller, the callee identity information, authorization duration and other information.

5. The computer-implemented method of claim 1, wherein the verifying of the authorization information further includes the callee being configured to verify the callee identity information by comparing predetermined identity information of the callee to the callee identity information found in the authorization information.

6. The computer-implemented method of claim 1, wherein the callee is configured to accept the call if the verification of the authorization information passes and reject the call if the verification of the authorization information fails.

7. A computer program product for verifying a commission-based relationship in a communication system by authorization and verification based on event, the computer program product comprising a computer readable storage medium having program instructions embodied therewith, the program instructions executable by a system comprising one or more processors to cause the system to perform a method, the method comprising:

generating, by an authorizer of the system, authorization information that is to be transmitted to a caller and forwarded by the caller to a callee upon a call being initiated between the caller and the callee, wherein the authorization information includes at least authorizer identity information, callee identity information, and a caller public key;

signing, by the authorizer, the authorization information with a private key of the authorizer; and transmitting the signed authorization information to the caller;

wherein the caller is configured to generate a digital signature via a private key of the caller and transmit the digital signature and the signed authorization information to the callee; and wherein the callee is configured to verify the authorization information by at least verifying the signature of the signed authorization information via a public key of the authorizer, extracting the public key of the caller from the authorization information, and verifying an identity of the caller based on the extracted public key of the caller, and wherein the verifying of the authorization information further includes the callee being configured to verify the authorizer identity information based on the public key of the authorizer.

8. The computer program product of claim 7, wherein the callee is further configured to:
maintain a whitelist comprising a plurality of public keys of a plurality of entities;
check the whitelist to determine if the authorizer is allowed to contact the callee; and
perform the verifying of the authorization information in response to determining that the authorizer is allowed to contact the callee, wherein the callee is configured to accept the call from the caller in response to the authorization information being verified.

9. The computer program product of claim 7, wherein the authorization information further includes authorization duration information, wherein the verifying of the authorization information further includes the callee being configured to determine whether a predetermined authorization deadline found in the authorization duration information has expired, wherein the callee is configured to reject the call from the caller in response to the authorization deadline being expired.

10. The computer program product of claim 7, wherein the signed authorization information includes the authorizer identity information, the public key of caller, the callee identity information, authorization duration and other information.

11. The computer program product of claim 7, wherein the verifying of the authorization information further includes the callee being configured to verify the callee identity information by comparing predetermined identity information of the callee to the callee identity information found in the authorization information.

12. The computer program product of claim 7, wherein the callee is configured to accept the call if the verification of the authorization information passes and reject the call if the verification of the authorization information fails.

13. A communication system for verifying a commission-based relationship in a communication system by authorization and verification based on event, the communication system comprising:
   an authorizer comprising a first computing device;
   a caller comprising a second computing device; and
   a callee comprising a third computing device;
   wherein the authorizer is configured to:
     generate authorization information that is to be transmitted to a caller and forwarded by the caller to a callee upon a call being initiated between the caller and the callee, wherein the authorization information includes at least authorizer identity information, callee identity information, and a caller public key;
     sign the authorization information with a private key of the authorizer; and
     transmit the signed authorization information to the caller;
   wherein the caller is configured to generate a digital signature via a private key of the caller and transmit the digital signature and the signed authorization information to the callee; and
   wherein the callee is configured to verify the authorization information by at least verifying the signature of the signed authorization information via a public key of the authorizer, extracting the public key of the caller from the authorization information, and verifying an identity of the caller based on the extracted public key of the caller, and
   wherein the verifying of the authorization information further includes the callee being configured to verify the authorizer identity information based on the public key of the authorizer.

14. The communication system of claim 13, wherein the callee is further configured to:
   maintain a whitelist comprising a plurality of public keys of a plurality of entities;
   check the whitelist to determine if the authorizer is allowed to contact the callee; and
   perform the verifying of the authorization information in response to determining that the authorizer is allowed to contact the callee, wherein the callee is configured to accept the call from the caller in response to the authorization information being verified.

15. The communication system of claim 13, wherein the authorization information further includes authorization duration information, wherein the verifying of the authorization information further includes the callee being configured to determine whether a predetermined authorization deadline found in the authorization duration information has expired, wherein the callee is configured to reject the call from the caller in response to the authorization deadline being expired.

16. The communication system of claim 13, wherein the signed authorization information includes the authorizer identity information, the public key of caller, the callee identity information, authorization duration and other information.

17. A computer-implemented method for verifying a commission-based relationship in a communication system by authorization and verification based on event, the method comprising:
   receiving, by a callee comprising one or more processors, from a caller, a digital signature and authorization information, wherein the authorization information includes at least authorizer identity information, callee identity information, and a caller public key, wherein the authorization information is signed by an authorizer with a private key of the authorizer, wherein the authorizer is configured to generate the authorization information, sign the authorization information, and transmit the authorization information to the caller, wherein the caller is configured to generate the digital signature via a private key of the caller and transmit the digital signature and the signed authorization information to the callee;
   verifying, by the callee, the authorization information by at least verifying the signature of the signed authorization information via a public key of the authorizer, extracting the public key of the caller from the authorization information, and verifying an identity of the caller based on the extracted public key of the caller; and
   accepting, by the callee, a call from the caller upon the verification of the authorization information passing,
   wherein the verifying of the authorization information further includes the callee being configured to verify the authorizer identity information based on the public key of the authorizer.

18. The computer-implemented method of claim 17 further comprising:
   maintaining, by the callee, a whitelist comprising a plurality of public keys of a plurality of entities;
   checking, by the callee, the whitelist to determine if the authorizer is allowed to contact the callee; and
   in response to determining that the authorizer is allowed to contact the callee, performing, by the callee, the verifying of the authorization information.

19. The computer-implemented method of claim 17, wherein the authorization information further includes authorization duration information, wherein the verifying of the authorization information further includes determining whether a predetermined authorization deadline found in the authorization duration information has expired and rejecting the call from the caller in response to the authorization deadline being expired.

20. A computer program product for verifying a commission-based relationship in a communication system by authorization and verification based on event, the computer program product comprising a computer readable storage medium having program instructions embodied therewith, the program instructions executable by a system comprising one or more processors to cause the system to perform a method, the method comprising:
   receiving, by a callee, from a caller, a digital signature and authorization information, wherein the authorization information includes at least authorizer identity information, callee identity information, and a caller public key, wherein the authorization information is signed by an authorizer with a private key of the authorizer; wherein the authorizer is configured to generate the authorization information, sign the authorization information, and transmit the authorization information to the caller, wherein the caller is configured to generate the digital signature via a private key of the caller and transmit the digital signature and the signed authorization information to the callee;
   verifying, by the callee, the authorization information by at least verifying the signature of the signed authorization information via a public key of the authorizer, extracting the public key of the caller from the authorization information, and verifying an identity of the caller based on the extracted public key of the caller; and accepting, by the callee, a call from the caller upon the verification of the authorization information passing, wherein the verifying of the authorization information further includes the callee being configured to verify the authorizer identity information based on the public key of the authorizer.

21. The computer program product of claim 20 further comprising:

maintaining, by the callee, a whitelist comprising a plurality of public keys of a plurality of entities;

checking, by the callee, the whitelist to determine if the authorizer is allowed to contact the callee; and in response to determining that the authorizer is allowed to contact the callee, performing, by the callee, the verifying of the authorization information.

22. The computer program product of claim 20, wherein the authorization information further includes authorization duration information, wherein the verifying of the authorization information further includes determining whether a predetermined authorization deadline found in the authorization duration information has expired and rejecting the call from the caller in response to the authorization deadline being expired.

\* \* \* \* \*